US011243969B1

(12) United States Patent
Sayre et al.

(10) Patent No.: US 11,243,969 B1
(45) Date of Patent: Feb. 8, 2022

(54) SYSTEMS AND METHODS FOR INTERACTION BETWEEN MULTIPLE COMPUTING DEVICES TO PROCESS DATA RECORDS

(71) Applicant: MASSACHUSETTS MUTUAL LIFE INSURANCE COMPANY, Springfield, MA (US)

(72) Inventors: Mark Sayre, Springfield, MA (US); Ramiro Ballesteros, Springfield, MA (US)

(73) Assignee: HITPS LLC, New York, NY (US)

(*) Notice: Subject to any disclaimer, the term of this patent is extended or adjusted under 35 U.S.C. 154(b) by 177 days.

(21) Appl. No.: 16/785,363

(22) Filed: Feb. 7, 2020

(51) Int. Cl.
G06F 16/25 (2019.01)
G06F 16/28 (2019.01)
G06F 16/174 (2019.01)
G06F 16/14 (2019.01)

(52) U.S. Cl.
CPC ............ G06F 16/25 (2019.01); G06F 16/156 (2019.01); G06F 16/1748 (2019.01); G06F 16/285 (2019.01)

(58) Field of Classification Search
CPC .... G06F 16/25; G06F 16/285; G06F 16/1748; G06F 16/156
USPC ........................................................ 707/769
See application file for complete search history.

(56) References Cited

U.S. PATENT DOCUMENTS

| | | | |
|---|---|---|---|
| 6,801,603 B1* | 10/2004 | Arev | H04L 51/36 379/88.12 |
| 7,415,471 B1* | 8/2008 | Coleman | G06Q 10/10 |
| 7,636,742 B1* | 12/2009 | Olavarrieta | G06F 40/174 |
| 10,169,607 B1* | 1/2019 | Sheth | G06Q 10/10 |
| 10,803,050 B1* | 10/2020 | Salkola | G10L 15/187 |
| 11,062,591 B1* | 7/2021 | Cascioli | G08B 25/10 |
| 2011/0320458 A1* | 12/2011 | Karana | G06F 16/20 707/741 |
| 2012/0084367 A1* | 4/2012 | Killoran, Jr. | G06F 16/955 709/206 |
| 2014/0279757 A1* | 9/2014 | Shimanovsky | H04W 16/24 706/12 |
| 2014/0304054 A1* | 10/2014 | Orun | G06Q 30/0225 705/14.26 |
| 2016/0086262 A1* | 3/2016 | Straub | G06Q 50/265 705/38 |
| 2016/0164928 A1* | 6/2016 | Bastide | H04L 51/32 709/206 |

(Continued)

Primary Examiner — Phuong Thao Cao
(74) Attorney, Agent, or Firm — Foley & Lardner LLP

(57) ABSTRACT

A system may include a server, which may receive a request from a customer device. The server may retrieve data records associated with the request from data sources. The server may process and present a standardized data record on analyst devices. The server may remove data gaps from the standardized data record, in response to receiving inputs from at least one analyst device. The server may generate and update status indicators on a user interface of each analyst device when any analyst device may operate on the standardized data record. The server may use a completed data record to generate a dynamic electronic document. The server may present the dynamic electronic document on a user interface of the customer device. The server may update values within the dynamic electronic document when there is a change in information within the data records.

20 Claims, 5 Drawing Sheets

(56) References Cited

U.S. PATENT DOCUMENTS

| | | | |
|---|---|---|---|
| 2016/0180245 A1* | 6/2016 | Tereshkov | G06F 16/2237 |
| | | | 706/12 |
| 2016/0314186 A1* | 10/2016 | Bremer | G06F 16/215 |
| 2016/0371435 A1* | 12/2016 | Pauletto | G06F 16/24564 |
| 2017/0220525 A1* | 8/2017 | Chiau | G06F 17/15 |
| 2017/0277773 A1* | 9/2017 | Iasi | G06F 16/9535 |
| 2018/0053199 A1* | 2/2018 | Mathis | G06F 16/285 |
| 2018/0082021 A1* | 3/2018 | Himeno | H04L 63/10 |
| 2018/0150599 A1* | 5/2018 | Valdes | G16H 10/60 |
| 2018/0210936 A1* | 7/2018 | Reynolds | G06F 3/0484 |
| 2018/0336286 A1* | 11/2018 | Shah | G06Q 10/10 |
| 2019/0005112 A1* | 1/2019 | Tripathi | G06F 16/288 |
| 2019/0188313 A1* | 6/2019 | Bansal | G06F 16/285 |
| 2019/0289025 A1* | 9/2019 | Kursun | H04L 41/16 |
| 2020/0089693 A1* | 3/2020 | Fulzele | G06F 16/258 |

* cited by examiner

SYSTEMS AND METHODS FOR INTERACTION BETWEEN MULTIPLE COMPUTING DEVICES TO PROCESS DATA RECORDS

TECHNICAL FIELD

The subject matter described herein relates generally to data processing systems, and more specifically directed towards systems and methods for interaction between multiple computing devices to process data records and generate an electronic document.

BACKGROUND

As processing power of computers have increased, and as the Internet technology era allows for greater computer functionality and efficient computing system interconnectivity, many companies utilize conventional computing systems as underwriting platforms for generating electronic documents for their customers. Presently, nearly all insurance companies use conventional computer-based underwriting platforms for evaluating and processing data associated with their customers, which may be used to generate the electronic documents. Since the implementation of the computer-based underwriting platforms, several technical shortcomings have been identified, and have created a new set of challenges.

One such challenge is that the conventional computer-based underwriting platforms may have to process a very large volume of data. The data may be directly or indirectly associated with the customers, and is generated according to various company-specific and product-specific data models. The data may often be duplicated, fragmented, incomplete, and is in incompatible data formats. As a result, the conventional computer-based underwriting platforms are not able to timely collect, verify, analyze, and efficiently organize all of the data associated with the customers. Therefore, analyst devices do not have proper access to comprehensive and complete datasets associated with the customers to generate precise electronic documents for the customers in a timely and an efficient manner.

Another challenge is that the conventional computer-based underwriting platforms may not allow the analyst devices to collaborate with each other. In various instances, two or more analyst devices may work on same task requests at a same time. However, since the two or more analyst devices may not be able to collaborate and promptly share a current status of the task requests with each other, it may result in some of the task requests being executed twice.

SUMMARY

For the aforementioned reasons, what is therefore needed is a data processing system, which may overcome above-mentioned problems associated with conventional computer-based underwriting platforms. The data processing system may include multiple hardware components and software algorithms coupled to each other to efficiently process a request received from a customer device. In response to the request, a server may retrieve multiple data records associated with the request from multiple data sources. The multiple data sources may generate and store the data records in various data model regimes, many of which are not standardized or are variants of a standard. The server may process the data records in accordance with the request, and present the data records on user interfaces of one or more analyst devices. The server may remove data gaps and duplicates, format, organize, summarize, consolidate, and categorize the data records, in response to receiving inputs from the one or more analyst devices. The server may generate and update status indicators on a user interface of each analyst device when any analyst device may operate on the data records. The server may use processed data records to generate a dynamic electronic document. The server may present the dynamic electronic document on customized execution environments and graphical user interfaces associated with the customer device. The server may update values within the dynamic electronic document when there is a change in information within the data records. The server may present a notification on the graphical user interface of the customer device when the electronic document may be updated. The notification may include the information associated with all updates within the electronic document.

In one embodiment, a server-implemented method may include receiving, by a server, a request for an electronic document from a customer device, wherein the request comprises an identifier associated with a customer operating the customer device; retrieving, by the server from a plurality of data-generating systems, a plurality of data records associated with the request using the identifier associated with the customer to generate a standardized data record; determining, by the server, one or more data gaps associated with one or more data fields in the standardized data record, the one or more data gaps corresponding to missing data or incomplete data in the standardized data record; categorizing, by the server, the one or more data fields into one or more categories based on subject matter within each data field such that each data field is placed in at least one category; displaying, by the server, one or more sub-modules associated with each category comprising at least one data field corresponding to at least one data gap on a first graphical user interface of a first analyst device within a plurality of analyst devices, each sub-module comprising a status indicator and an input element to receive an input regarding the missing data or incomplete data, the status indicator corresponding to a completion status of each data gap; in response to the first analyst device interacting with the input element of the one or more sub-modules, updating, by the server, the status indicator associated with the one or more sub-modules; updating, by the server in real time, the one or more sub-modules displayed on other analyst devices within the plurality of analyst devices such that when a second analyst device views the one or more sub-modules on its second graphical user interface, an updated status indicator corresponding to the interaction of the first analyst device with the input element of the one or more sub-modules is displayed on the second graphical user interface; and transmitting, by the server, a notification to the other analyst devices configured to direct the other analyst devices to each updated sub-module.

In another embodiment, a system may include a server configured to receive a request for an electronic document from a customer device, wherein the request comprises an identifier associated with a customer operating the customer device; retrieve from a plurality of data-generating systems, a plurality of data records associated with the request using the identifier associated with the customer to generate a standardized data record; determine one or more data gaps associated with one or more data fields in the standardized data record, the one or more data gaps corresponding to missing data or incomplete data in the standardized data record; categorize the one or more data fields into one or more categories based on subject matter within each data field such that each data field is placed in at least one category; display one or more sub-modules associated with each category comprising at least one data field corresponding to at least one data gap on a first graphical user interface of a first analyst device within a plurality of analyst devices, each sub-module comprising a status indicator and an input element to receive an input regarding the missing data or incomplete data, the status indicator corresponding to a completion status of each data gap; in response to the first analyst device interacting with the input element of the one or more sub-modules, update the status indicator associated with the one or more sub-modules; update in real time, the one or more sub-modules displayed on other analyst devices within the plurality of analyst devices such that when a second analyst device views the one or more sub-modules on its second graphical user interface, an updated status indicator corresponding to the interaction of the first analyst device with the input element of the one or more sub-modules is displayed on the second graphical user interface; and transmit a notification to the other analyst devices configured to direct the other analyst devices to each updated sub-module.

It is to be understood that both the foregoing general description and the following detailed description are exemplary and explanatory and are intended to provide further explanation of the subject matter as claimed.

BRIEF DESCRIPTION OF THE DRAWINGS

The accompanying drawings constitute a part of this specification and illustrate embodiments that, together with the specification, explain the subject matter.

FIG. 3C shows an interactive graphical user interface of an analyst device, according to an embodiment.

DETAILED DESCRIPTION

Figure 1:
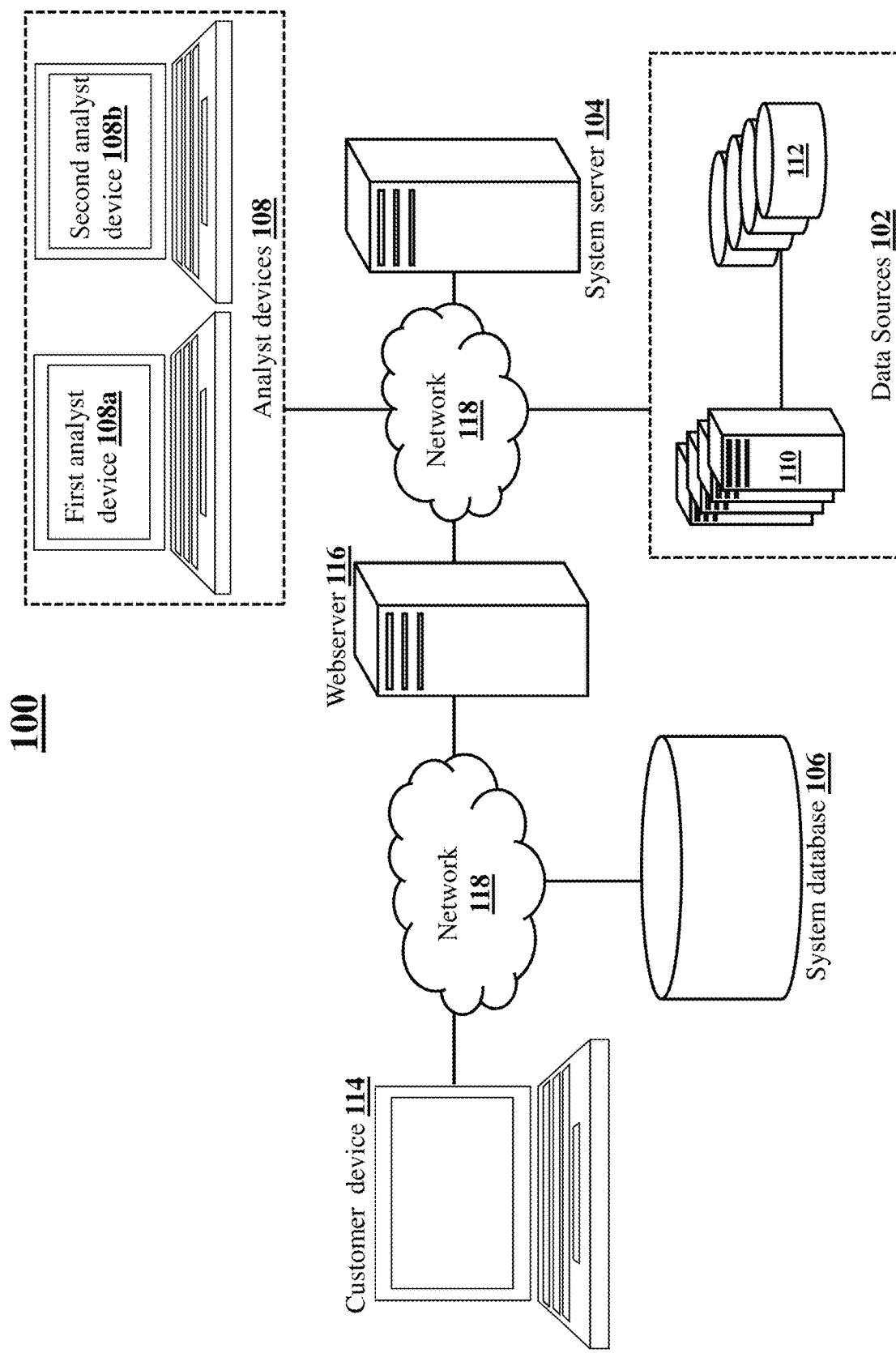
FIG. 1 shows a data processing system, according to an embodiment.

The present disclosure is here described in detail with reference to embodiments explained in the drawings, which form a part here. Other embodiments may be used and/or other changes may be made without departing from the spirit or scope of the present disclosure. The embodiments described in the detailed description are not meant to be limiting of the subject matter presented here.

Reference will now be made to the embodiments in the drawings, and specific language will be used here to describe the same. It will nevertheless be understood that no limitation of the scope of the claims or this disclosure is thereby intended. Alterations and further modifications of the features explained herein, and additional applications of the principles of the subject matter explained herein, which would occur to one skilled in the relevant art and having possession of this disclosure, are to be considered within the scope of the subject matter disclosed herein.

FIG. 1 show various components of a data processing system 100. The data processing system 100 may be an underwriting system employed by an insurance company. The data processing system 100 may include data sources 102, a system server 104, a system database 106, one or more analyst devices 108, a customer device 114, and a webserver 116. The data sources 102 may include data generating servers 110 and service databases 112. The one or more analyst devices 108 include a first analyst device 108a and a second analyst device 108b.

The data sources 102, the system server 104, the system database 106, the one or more analyst device 108, the customer device 114, and the webserver 116 communicate with each other over the network 118. The data generating servers 110 and the service databases 112 communicate with each other over the network 118. The network 118 may include, but is not limited to, private or public local area network, wireless local area network, metropolitan area network, wide-area network, and the Internet. The network 118 may further include both wired and wireless communications, according to one or more standards, via one or more transport mediums. The communication over the network 118 may be performed in accordance with various communication protocols, such as, transmission control protocol and internet protocol, user datagram protocol, and institute of electrical and electronics engineers communication protocols. The network 118 may further include wireless communications, according to Bluetooth specification sets, or another standard or proprietary wireless communication protocol. The network 118 may further include communications over a cellular network, including, for example, a global system for mobile communications, code division multiple access, and enhanced data for global evolution network.

The data processing system 100 is described in a context of computer-executable instructions, such as program modules, being executed by a server computer, such as, the system server 104. The program modules may include programs, objects, components, data structures, etc. that perform particular tasks or implement particular abstract data types. The features of the integrated data processing system 100 may be practiced either in a computing device, or in a distributed computing environment, where the tasks are performed by processing devices, which may be linked through a network 118. In a distributed computing environment, program modules may be located in both local and remote computer storage media including memory storage devices.

The data processing system 100 may operate in a local computing environment where the data sources 102 and application programs associated with an underwriting software application may be stored and executed on local computing resources. The data processing system 100 may operate in a cloud-computing environment where the customer device 114 and the one or more analyst devices 108 may be cloud-optimized. The data sources 102 and the application programs associated with the underwriting software application may be stored and executed on a remote cloud-based system server 104 accessed over a network cloud.

Data sources 102 may generate raw data records associated with various customers. The data sources 102 may include one or more data generation servers 110 and one or more service databases 112. The data generating servers 110 and the service databases 112 may communicate with each other over the network 118.

Each data generation server 110 may be a server computing device. The server computing device may include a processing unit, and a non-transitory machine-readable storage medium. The processing unit may include a processor with a computer-readable medium, such as, a random access memory coupled to the processor. The data generation server 110 may generate the raw data records associated with the customers according to a data model in a particular format. The data generation server 110 may fetch the raw data records associated with the customers from social media networks, social security sources, financial sources, and other external sources. Each data generation server 110 may process and transmit the raw data records to a corresponding service database 112 over the network 118.

Each service database 112 may receive the raw data records from corresponding data generation server 110 over the network 118. Each service database 112 may store the raw data records, generated by at least one data generation server 110, according to a number of data formats (e.g., Extensible Markup Language, JavaScript Object Notation, text file, etc.). Each service database 112 may store the raw data records in multiple formats, which may be fetched by the at least one data generation server 110.

The data sources 102 may be in communication with the system server 104. The data sources 102 may transmit the raw data records to the system server 104 over the network 118. The system server 104 may fetch the raw data records from the service databases 112 based on a triggering condition (e.g., time-based periodic updates, real-time updates). The raw data records may include, but not limited to, social security data records, financial data records, stock market data records, risk data records, existing customers data records, among various other types of data records.

A system server 104 is a computing device. The system server 104 may include a processing unit and a non-transitory machine-readable storage medium. The processing unit may include a processor with a computer-readable medium, such as, a random access memory coupled to the processor. The system server 104 may execute algorithms or computer executable program instructions in a distributed configuration. The system server 104 may interact with one or more software modules of a same or a different type operating within the data processing system 100.

Non-limiting examples of the processor may include a microprocessor, an application specific integrated circuit, and a field programmable object array, among others. The system server 104 may be capable of executing data processing tasks and data analysis tasks. Non-limiting examples of the system server 104 may include a desktop computer, a server computer, a laptop computer, a tablet computer, and the like. For ease of explanation, the FIG. 1 shows a single server computing device functioning as the system server 104. However, some embodiments may include multiple server computing devices capable of performing various tasks described herein.

The system server 104 may be coupled to the data sources 102 and the one or more analyst device 108 via the network 118. When a web connection is established, the system server 104 is able to receive the raw data records from the data sources 102 and any request from the one or more analyst devices 108. At the same time, the system server 104 is able to transmit processed and formatted data records to the system database 106 and any information to the customer device 114 and the one or more analyst devices 108.

The system server 104 may retrieve the raw data records from the data sources 102. The system server 104 may receive the raw data records from the data sources 102. The system server 104 may execute one or more software modules (e.g., APIs, web hooks, and web sprockets) to consume (e.g., retrieve/pull, receive) the raw data records from the data sources 102. The software modules may be configured to receive or pull the raw data records from each particular data source 102, as required by each particular data source 102. In some cases, a data source 102 may be configured to transmit a set of raw data records at regular interval, using a data transfer protocol (e.g., FTP, SFTP). The raw data records may include, but not limited to, social security data records, financial data records, stock market data records, risk data records, existing customers data records, among various other types of data records.

The system server 104 may generate a notification upon obtaining the raw data records from the data sources 102. The system server 104 may transmit the notification to a database server associated with the system database 106. The notification may include an electronic message containing information associated with a date and a time of receipt of the raw data records. The electronic message may further include information associated with a number and a type of the raw data records. The system server 104 may store the notification in the system database 106.

The system server 104 may process the raw data records. The system server 104 may execute one or more machine learning models on portions or all of the raw data records to process the raw data records. The machine learning models may be associated with machine learning algorithms trained using training datasets. Upon execution of the machine learning models, the system server 104 may identify data field entries in the raw data records, which are incomplete, missing, duplicated, or not required. The system server 104 may remove or correct the data records, which have missing or incomplete data fields. The system server 104 may remove a duplicate copy of each data record. The system server 104 may store data records, which have been processed in the system database 106.

The system server 104 may identity one or more data records having a common property or feature from the data records. The system server 104 use one or more rules to identify the one or more data records from the data records having the common property. The system server 104 may aggregate the one or more data records having the common property. The system server 104 may store aggregated data records having the common property in the system database 106. The property may correspond to a type of a product, a type of a record, etc.

The system server 104 may format and reconstruct the data records into a common data model format or a common name format. The system server 104 may execute a standardization algorithm to convert and standardize different formats and names associated with the data records into a single common data format and/or a single common name format. In one example, a first data record may include information referred by letters and a second data record may include the information referred by symbols. In response to the execution of the standardization algorithm, the information in the second data record may be converted into the letters or the information in the first data record may be converted into the symbols. In another example, a first data record may include a first drug referred by its generic name (for instance, infliximab) and a second data record may include the first drug referred by its brand name (for instance, Remicade). In response to the execution of the standardization algorithm, the first drug may be refereed by its generic name or the brand name in both the first data record and the second data record.

The system server 104 may process strings, symbols, and identifiers in the data records. If the strings, the symbols, and the identifiers are improperly formatted, the system server 104 may format the data records into an appropriate format.

In one example, if the system server 104 receives the string, the symbol, and the identifier within the data records in a first format, the system server 104 may convert the string, the symbol, and the identifier from the first format into a second format. The first format of the data records may be in a first character-encoding scheme and the second format may be in a second character-encoding scheme. The system server 104 may change the formats based on data structure compatibility, processor compatibility, or computational efficiency of devices of the data processing system 100.

The system server 104 may process inputs within the data records. An input may be in a natural language form, such as, in a sentence, sound, or image. The system server 104 may process the inputs by implementing a natural language processing algorithms, which may be based on statistical model machine learning. The natural language processing algorithms may involve automatic summarization, co-reference resolution, discourse analysis, machine translation, morphological segmentation, named entity recognition, native language identification, natural language generation, natural language understanding, part-of-speech tagging, parsing, question answering, relationship extraction, sentence breaking, sentiment analysis, speech recognition, speech segmentation, stemming, topic segmentation and recognition, word segmentation, word sense disambiguation, or others.

The system server 104 may identify one or more data fields within the data records. The data fields may include information associated with sources of the data records and features of the data records. Non-limiting examples of the sources of the data records may include websites, external databases, and government agencies. Non-limiting examples of the features of the data records may include information associated with a type of the data record and a category of the data record. The system server 104 may compare certain fields of two or more inbound data records being transmitted from disparate data sources 102, to determine whether the two or more inbound data records are related to the same feature and/or the same source. The system server 104 may group the data records that have a same feature or a same source or both.

The processing of the data records using above-mentioned algorithms and models may include formatting, organizing, summarizing, consolidating, and categorizing the data records. The system server 104 may associate each unique set of formatted, organized, summarized, consolidated, and categorized data records to a corresponding sub-database within the system database 106, based on data fields in the set of formatted, organized, summarized, consolidated, and categorized data records. Each sub-database within the system database 106 is configured to store a specific set of formatted, organized, summarized, consolidated, and categorized data records data records. The system server 104 may transmit each formatted, organized, summarized, consolidated, and categorized data record into the corresponding sub-database within the system database 106.

In one example, a first sub-database within the system database 106 may store the formatted, organized, summarized, consolidated, and categorized data records that are associated with a first feature (e.g., credit history records of all citizens), and a second sub-database within the system database 106 may store the formatted, organized, summarized, consolidated, and categorized data records that are associated with a second feature (e.g. credit history records for senior citizens). A first data record may include the credit history records for all citizens. A second data record may include the credit history records for senior citizens. The system server 104 may process information within the first data record and the second data record, and transmit both the first data record and the second data record into the first sub-database as both the first data record and the second data record are associated with the credit history records for all citizens. The system server 104 may only transmit the first data record into the second sub-database as the first data record is only associated with the credit history records for the senior citizens.

The system server 104 may generate and execute mapping algorithms, which may enable automatic mapping of new data records from the data sources 102 into corresponding sub-databases within the system database 106. The mapping algorithms may link one or more features associated with the new data records with the corresponding sub-databases within the system database 106. When the data sources 102 may generate new raw data records, the system server 104 may automatically process and then perform cross-referencing and correlation of the new data records among each other. The system server 104 may format, organize, summarize, consolidate, and categorize the new data records. The formatting, organizing, summarizing, consolidating, and categorizing process may automatically trigger execution of the mapping algorithms as it may indicate that the new data records have arrived. The sub-databases within the system database 106 may be automatically populated with corresponding unique new data records.

The system server 104 may receive a query associated with the customer from one or more underwriting software applications being executed on the one or more analyst devices 108. The query may include the request for certain data records and an electronic document containing values based on analysis of the certain data records. In some implementations, the system server 104 may directly receive the request from a web application being executed on the customer device 114. The request may include identification records of the customer, such as a social security number.

The system server 104 may query the system database 106 using the identification records of the customer. The system server 104 may retrieve one or more data records associated with the customer. The system server 104 may generate a dynamic electronic document based on an evaluation of the one or more data records, as well as additional factors and variables. The additional factors and variables may be associated with records of other customers similar to a profile of the customer. The electronic document may include one or more values. The one or more values may depend on one or more variables and other relevant attributes associated with the customer.

The system server 104 may execute a data model to generate the electronic document based on the one or more data records associated with the customer and other information within the request of the customer. The system server 104 may train the data model using machine learning algorithms. The system server 104 may employ one or more machine learning algorithms, such as neural networks and support vector machines for predictive modeling. The system server 104 may train the data model based on data samples within a certain period. The data model may represent a mathematical or computational model. The data model may include mathematical functions. The mathematical functions may describe a relationship between each neuron within the neural network using weight and bias factors. The data model may include a mathematical function describing how the neurons are divided into one or more layers.

The system server 104 may use a weighted combination of factors and variables associated with the one or more data records associated with the customer and other information within the request of the customer to generate the electronic document. The electronic document may include numeric values. The values in the electronic document may not be static values because the system server 104 may dynamically update these values in real time. The system server 104 may iteratively and dynamically update the values in the electronic document based on a change of information within the one or more data records associated with the customer. Accordingly, the system server 104 may update the values within the electronic document when new data sources 102 are added or updated as the new data sources 102 may provide new data records associated with the customer. The system server 104 may continuously update the values in the electronic document by iteratively querying different conditions affecting the values and recalculating the values.

The system server 104 may present the dynamic electronic document on an interactive graphical user interface of the one or more analyst devices 108. The one or more analyst devices 108 may verify values and variables within the dynamic electronic document. The one or more analyst devices 108 may present verified dynamic electronic document on the interactive graphical user interface of the customer device 114. The customer may use an input device associated with the customer device 114 to interact with information within the dynamic electronic document.

The system server 104 may update the interactive graphical user interface of the customer device 114 to reflect latest values within the dynamic electronic document. The system server 104 may generate a notification when the values within the electronic document may be updated. The notification may include information associated with a time and a date of the update of the values. The system server 104 may present the notification on the interactive graphical user interface of the customer device 114. The system server 104 may also present the notification on the interactive graphical user interface of the analyst device 108.

Analyst devices 108 may be computing devices comprising a processing unit and an interactive graphical user interface. The processing unit may execute a software application or a web browser application that accesses or receives the data records from the system database 106 and the system server 104. The processing unit may include a processor with computer-readable medium, such as, a random access memory coupled to the processor. The one or more analyst devices 108 may be running algorithms or computer executable program instructions, which may be executed by a single processor or multiple processors in a distributed configuration. The one or more analyst devices 108 may be configured to interact with one or more software modules of a same or a different type operating within the integrated data processing system 100.

Non-limiting examples of the processor may include a microprocessor, an application specific integrated circuit, and a field programmable object array, among others. Non-limiting examples of the one or more analyst devices 108 may include a server computer, a workstation computer, a tablet device, and a mobile device (e.g., smartphone, PDA). The one or more analyst devices 108 may be operated by analysts of an insurance company. The one or more analyst devices 108 may include a first analyst device 108a operated by a first analyst and a second analyst device 108b operated by a second analyst.

The one or more analyst devices 108 may receive a request for an electronic document from the customer device 114 via the web application. The request may have an information field indicating a nature of a potential request, and an another procedural information field indicating a time-sensitive nature or customer-sensitive nature of the potential request. The nature of the potential request may be related to subject matter (e.g., a type of insurance product associated with the request). Based on the information fields associated with the request, the first analyst device 108a or the second analyst device 108b may receive the request having subject matter or procedural data fields associated with respective analyst credentials. For instance, analyst credentials of a first analyst specializing in time sensitive requests would indicate to the system server 104 that the first analyst device 108a should receive requests having a data field indicating that a particular request is time sensitive.

The one or more analyst devices 108 may receive a standardized data record associated with the request from the system server 104. The standardized data record may include processed information from one or more data records associated with the customer. The processed information may include one or more data fields. The one or more analyst devices 108 may execute a first set of instructions to check the standardized data record against a checklist of items and determine one or more data gaps within the standardized data record. The first analyst device 108a may execute a second set of instructions to update the one or more data fields within the standardized data record when the standardized data record is incomplete or incorrect. The one or more data fields, which are updated may be tagged to reflect modified information or new information inputted by the one or more analyst devices 108. Each of one or more analyst devices 108 may be able to view tag associated with the one or more data fields.

The one or more analyst devices 108 may transmit verified and completed standardized data record to the system server 104. The system server 104 may process information within the standardized data record to generate the electronic document. The system server 104 may transmit the electronic document to the one or more analyst devices 108. The electronic document may be displayed on the graphical user interface of the one or more analyst devices 108. The one or more analyst devices 108 may update or approve the electronic document. The one or more analyst devices 108 may transmit the electronic document to the customer device 114. The electronic document may be displayed on the graphical user interface of the customer device 114.

A customer device 114 is a computing device comprising a processing unit. The processing unit may include a processor with computer-readable medium, such as, a random access memory coupled to the processor. The customer device 114 may be running algorithms or computer executable program instructions, which may be executed by a single processor or multiple processors in a distributed configuration. The customer device 114 may be configured to interact with one or more software modules of a same or a different type operating within the integrated data processing system 100.

Non-limiting examples of the processor may include a microprocessor, an application specific integrated circuit, and a field programmable object array, among others. Non-limiting examples of the customer device 114 may include a server computer, a workstation computer, a tablet device, and a mobile device (e.g., smartphone, PDA). The customer device 114 is operated by a customer of the insurance company. For ease of explanation, the FIG. 1 show a single computing device functioning as the customer device 114. However, some embodiments may include multiple computing devices capable of performing tasks described herein.

The customer device 114 may transmit credentials from customer inputs to the webserver 116, from which the webserver 116 may authenticate the customer. The customer device 114 may include a number of input devices (e.g., mouse, keyboard, touchscreen, stylus) to receive the customer inputs, including various types of data inputs allowing for authentication, e.g., customer name, passwords, certificates, biometrics.

The customer device 114 may execute a client-side web application for generating and transmitting a request for an electronic document. The web application may display interactive icons or buttons on a graphical user interface of the customer device 114. The triggering of the icons may generate a screen having a plurality of portions on the graphical user interface. A first portion of the screen may present a questionnaire having various questions related to various products, such as, insurance policy products. The customer may select a particular product for its request. The customer may submit answers to the questions related to a selected product. A second portion of the screen may provide a brief text box (for example, a text box with a pre-defined number of characters) having an expandable text capture capability to capture further explanation of the request.

The customer device 114 may submit the request and additional information associated with request using the web application. The information may include an identifier associated with the customer. The customer device 114 may transmit queries to the one or more analyst devices 108 via the webpages generated by the webserver 116, which may instruct the one or more analyst devices 108 to perform various tasks based on the request, such as, providing an electronic document. On receiving the request, the one or more analyst devices 108 may transmit the request to the system server 104. The system server 104 may execute the tasks associated with request, and generate the electronic document. The tasks may include retrieving and processing data records associated with the request for generating the electronic document. The system server 104 may transmit the electronic document to the analyst device 108. The one or more analyst devices 108 may validate the electronic document and transmit the electronic document to the customer device 114. In some cases, the system server 104 may directly transmit the electronic document to the customer device 114. The customer device 114 may present the electronic document on its specially designed interactive graphical user interface. The customer may interact with the electronic document using one or more input devices on the interactive graphical user interface.

A webserver 116 may be a computing device hosting a customer-centric web application accessible to the customer device 114 via the network 118 to generate a request. The webserver 116 may execute software applications configured to host the web application (e.g., Apache®, Microsoft IIS®), which may generate and serve various webpages of the web application on the customer device 114. The webserver 116 may require customer authentication based upon a set of customer authorization credentials (e.g., customer name, password, biometrics, cryptographic certificate). In such implementations, the webserver 116 may access the system database 106 configured to store customer credentials. The webserver 116 may reference the system database 106 in order to determine whether a set of entered credentials purportedly authenticating the customer match an appropriate set of credentials that identify and authenticate the customer. Similarly, in some implementations, the webserver 116 may generate and serve webpages to the customer device 114 based upon information associated with the customer and structure of a specialized graphical user interface of the customer device 114.

A system database 106 is capable of storing data in a plain format and an encrypted version. The data may include, but not limited to, records associated with the insurance company, profile records associated with customers, profile records associated with analysts, and raw data records. The system database 106 may store also formatted, organized, summarized, consolidated, and categorized data records. The system database 106 may be in communication with a processor of the system server 104, the webserver 116, the customer device 114, and the one or more analyst devices 108. The processor is capable of executing multiple commands of the data processing system 100. The system database 106 may be a part of the system server 104, the webserver 116, the customer device 114, and the one or more analyst devices 108. The system database 106 may be a separate component in communication with the system server 104, the webserver 116, the customer device 114, and the one or more analyst devices 108. The system database 106 may have a logical construct of data files, which are stored in non-transitory machine-readable storage media, such as, a hard disk or memory, controlled by software modules of a database program (e.g., SQL), and a database management system that executes the code modules (e.g., SQL scripts) for various data queries and management functions.

Figure 2:
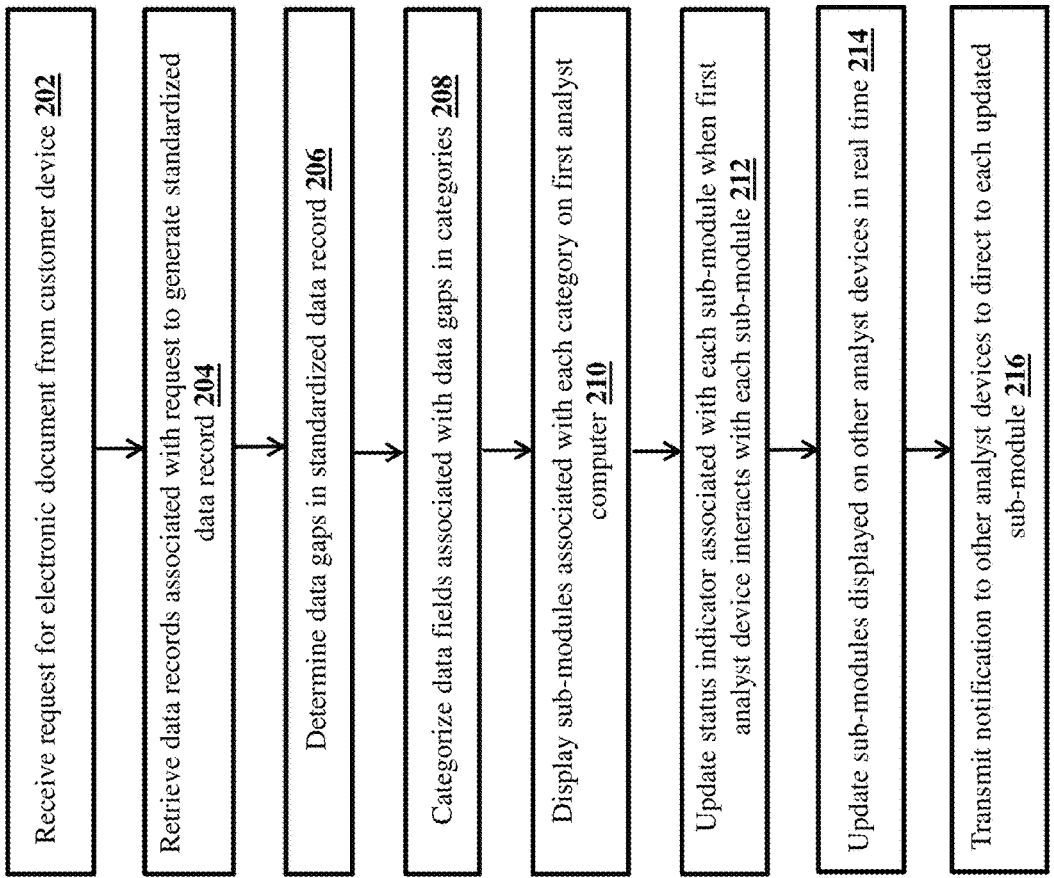
FIG. 2 shows a method to process data records and generate an electronic document, according to an embodiment.

FIG. 2 shows execution steps of generating an electronic document, according to a method 200. The method 200 shown in the FIG. 2 may include execution steps 202, 204, 206, 208, 210, 212, 214, and 216. However, it should be appreciated that some embodiments may comprise additional or alternative execution steps, or may omit one or more steps altogether. It should also be appreciated that other embodiments may perform certain execution steps in a different order; steps may also be performed simultaneously or near-simultaneously with one another. In addition, the method 200 of the FIG. 2 is described as being executed by a server, such as a system server in this embodiment. The server executing one or more steps may be programmed to execute various other, unrelated essential features. The steps may also be executed by multiple servers operating in a distributed computing environment.

In a first step 202, the server may receive a request for an electronic document from a customer device. The electronic document may be an insurance policy. The customer device may be operated by a customer. The request may include an identifier, such as a personal identification number associated with the customer. The personal identification number may be a social security number of the customer.

The customer device may execute a web application to generate the request. The server may directly receive the request from the customer device via the web application. The server may indirectly receive the request from the customer device via a first analyst device within a plurality of analyst devices. For instance, the first analyst device may receive the request from the customer device via the web application. The first analyst device may execute a protocol, such as an underwriting software application to process the request. The first analyst device may transmit the request to the server via the underwriting software application. The server may receive the request from the first analyst device.

In a next step 204, the server may retrieve a subset of raw data records associated with the customer from one or more service databases using the identifier within the request. The one or more service databases may store a set of raw data records for multiple customers. The subset of raw data records associated with the customer may include information selected from a group including, but not limited to, foreign travel records associated with the customer, family history records associated with the customer, medical records associated with the customer, stock market records associated with the customer, credit score records associated with the customer, etc.

One or more data-generating systems may generate the set of raw data records according to one or more data models associated with one or more formats and one or more data types. The server may receive the set of raw data records from the one or more data-generating systems. The server may store the set of raw data records in the one or more service databases. The server may handle the set of raw data records based at least in part by configuring the one or more data-generating systems to subscribe to a data feed of the set of raw data records. The data feed may be adapted to periodically collect the set of raw data records in RSS format, OPML format, or other formats from the one or more data-generating systems. The data feed may be periodically transmitted to the one or more service databases. The server may also execute a scanning or crawling protocol to periodically retrieve the set of raw data records from the one or more data-generating systems. The server may store the set of raw data records retrieved from the one or more data-generating systems in the one or more service databases.

The server may execute a comparison protocol to compare each data record within the subset of raw data records with remaining data records within the subset of raw data records to remove duplicate records within the subset of raw data records. The comparison protocol may be a record linkage software algorithm, which may be configured to identify and remove at least one data record within same data records in the subset of raw data records.

The server may execute one or more standardization algorithms on the subset of raw data records to merge an instance of each of the subset of raw data records in order to standardize and normalize the subset of raw data records according to a common data model. The server may select the common data model based on a configuration of the first analyst device. The server may select the common data model based on a configuration of the customer device. The server may select the common data model based on a common configuration of the first analyst device and the customer device. The server may standardize the subset of raw data records having multiple formats and multiple data types by mapping the transformation of the different formats for the raw data records having different data types to a single format and single data type, and thereby generate a standardized data record associated with the customer. The server may store the standardized data record in the database.

In a next step 206, the server may process the standardized data record, which may include one or more data fields. The one or more data fields may include a prior foreign trips field, a personal medical history field, etc. During the processing operation, the server may compare the standardized data record with a checklist of items. The checklist of items may include multiple data fields, which may be associated with prior foreign trips, future foreign trips, personal medical history, father medical history, etc. When the server may determine that the standardized data record does not contain each record corresponding to the checklist of items, the server may create a flag or a notification for missing data or incomplete data.

The server may determine one or more data gaps associated with the standardized data record. The one or more data gaps may correspond to the missing data or incomplete data in the standardized data record. For instance, the one or more data gaps may correspond to incomplete or no information associated with the one or more data fields, such as future foreign trips field, the father medical history field, etc. within the standardized data record. The server may generate one or more actions items to populate the missing data or provide the incomplete data associated with the one or more data gaps. The server may program each of the one or more action items for execution within a predetermined period of time.

In a next step 208, the server may categorize multiple data fields (for example, the prior foreign trips field, the personal medical history field, the future foreign trips field, the father medical history field), which may or may not have complete data associated with the customer into one or more categories (for example, foreign travel category and family history category) based on subject matter within each data field such that each data field is placed in at least one category. Upon categorization, the foreign travel category associated with the customer may include the prior foreign trips field and the future foreign trips field, and the family history category associated with the customer may include the personal medical history field and the father medical history field.

In a next step 210, the server may generate a web link to a secure webpage corresponding to the standardized data record. The secure webpage may display one or more sub-modules associated with each category in the standardized data record, which may include at least one data field corresponding to at least one data gap. Each sub-module may be associated with an action item, which may be programmed to be executed by one or more analyst devices within the predetermined period of time.

The server may transmit the web link to the secure webpage to the one or more analyst devices, which may display the one or more sub-modules on a graphical user interface of the one or more analyst devices. For instance, the one or more sub-modules may be presented on a first graphical user interface of the first analyst device and a second graphical user interface of a second analyst device. Each sub-module may include a status indicator and an input element to receive an input regarding the missing data or incomplete data within the predetermined period of time. The status indicator may correspond to a completion status of each data gap. Initially, the status indicator may be a "pending" indicator when the one or more sub-modules are presented on the first analyst device. The status indicator may be updated to a "progress" indicator when the first analyst device is operating on the one or more sub-modules. The status indicator may be updated to a "complete" indicator when the missing data or incomplete data associated with the one or more sub-modules has been submitted within the predetermined period of time.

In a next step 212, the first analyst device may interact with the input element of the one or more sub-modules, and submit input information regarding the missing data or incomplete data within the predetermined period of time. The server may update the status indicator associated with the one or more sub-modules, in response to the first analyst device interacting with the input element of the one or more sub-modules. The status indicator may updated to the "progress" indicator or the "complete" indicator depending on submitted input information.

In a next step 214, when the status indicator associated with the one or more sub-modules is updated, the server may update in real time the one or more sub-modules displayed on the graphical user interface of other analyst devices within the plurality of analyst devices, such as the second analyst device. When the second analyst device may view the one or more sub-modules on its second graphical user interface, an updated status indicator corresponding to the interaction of the first analyst device with the input element of the one or more sub-modules is presented. The updated status indicator may be the "progress" indicator, which may indicate that the first analyst device is currently operating on the one or more sub-modules. The updated status indicator may be the "complete" indicator, which may indicate that the first analyst device successfully submitted the missing data or incomplete data associated with the one or more sub-modules within the predetermined period of time.

In a next step 216, the server may transmit a notification to the other analyst devices configured to direct the other analyst devices to each updated sub-module. The notification may include information associated with each updated sub-module. The information may include a time and a date of update, the input information submitted regarding the missing data or incomplete data, etc.

The server may generate an electronic document when there is no incomplete or missing data in the standardized data record. The server may generate the electronic document based on evaluation of the data in all data fields within the standardized data record. The server may use a weighted combination of various factors and variables to generate the electronic document. The weighted combination may be applied based on one or more rules associated with a predetermined protocol.

The electronic document may include one or more dynamic values. The dynamic values in the electronic document may not be static values because the server may dynamically update these values in real time. The server may iteratively and dynamically update the values in the electronic document, based on change of underlying information within the standardized data record.

The server may present the electronic document on an interactive graphical user interface of the customer device. The one or more dynamic values may be automatically updated in response to change of the underlying information within the standardized data record. The server may generate a notification when the one or more dynamic values may be updated. The server may automatically display the notification on the interactive graphical user interface of the customer device.

The interactive graphical user interface of the customer device may include a plurality of selectable graphical components. The plurality of selectable graphical components may be associated with the electronic document. Each selectable graphical component may characterize a variable within the electronic document. The customer may interact with one or more selectable graphical components displayed on the interactive graphical user interface. The customer may use an eye movement to interact with the selectable graphical components displayed on the interactive graphical user interface. The customer may use a head movement to interact with the selectable graphical components displayed on the interactive graphical user interface. The customer may use a customer input device to interact with the selectable graphical components displayed on the interactive graphical user interface. For example, the customer may place a pointer of the customer input device over the selectable graphical components to interact with the selectable graphical components.

When the customer may interact with the selectable graphical components on the interactive graphical user interface, the server may generate various sub-interfaces on the interactive graphical user interface. The server may dynamically populate one or more sub-interfaces with additional information associated with the variable. For instance, when the variable is associated with an annual payment of a policy, the additional information associated with the variable may be each month payment information.

Figure 3A:
FIG. 3A shows an interactive graphical user interface of an analyst device, according to an embodiment.
Figure 3B:
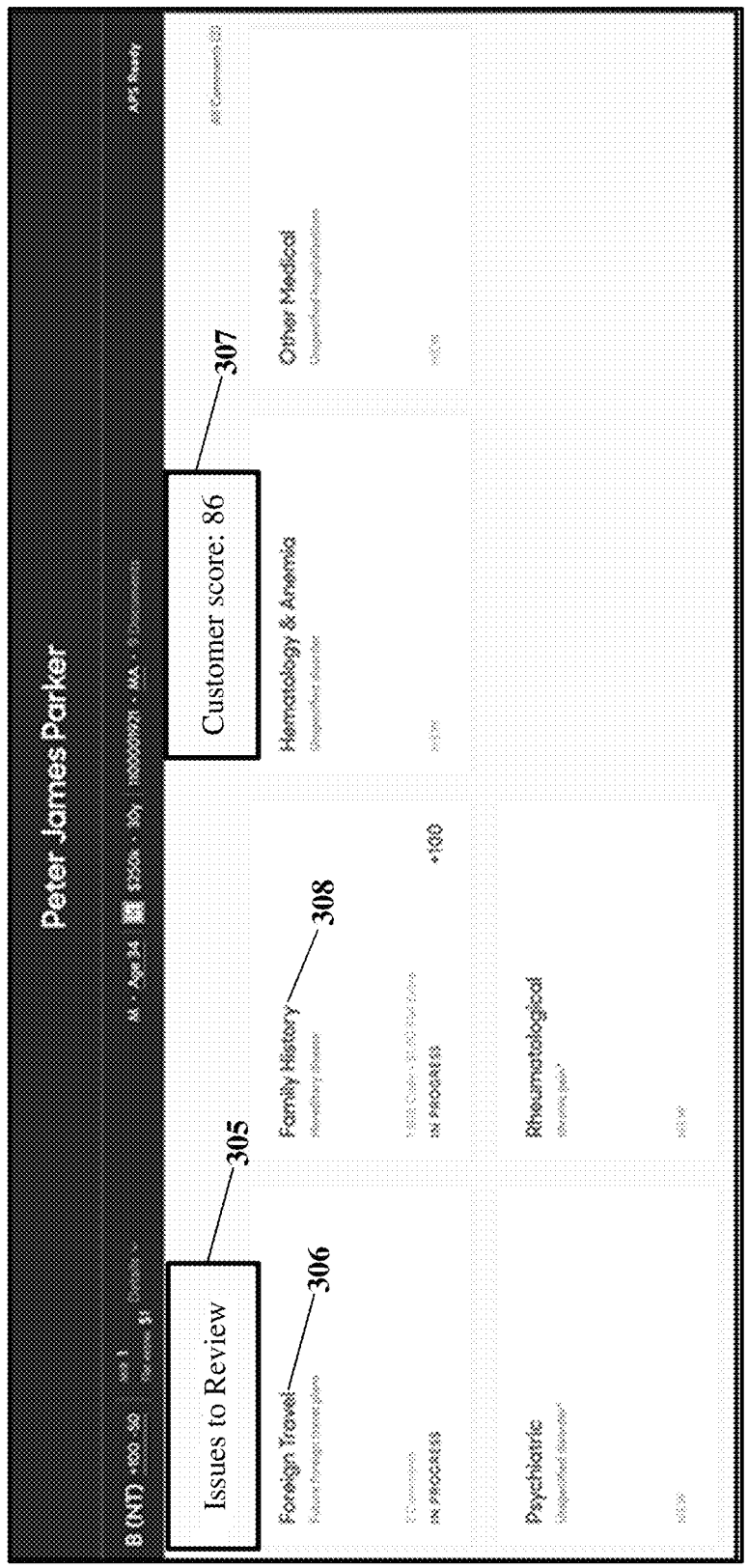
FIG. 3B shows an interactive graphical user interface of an analyst device, according to an embodiment.
Figure 3C:
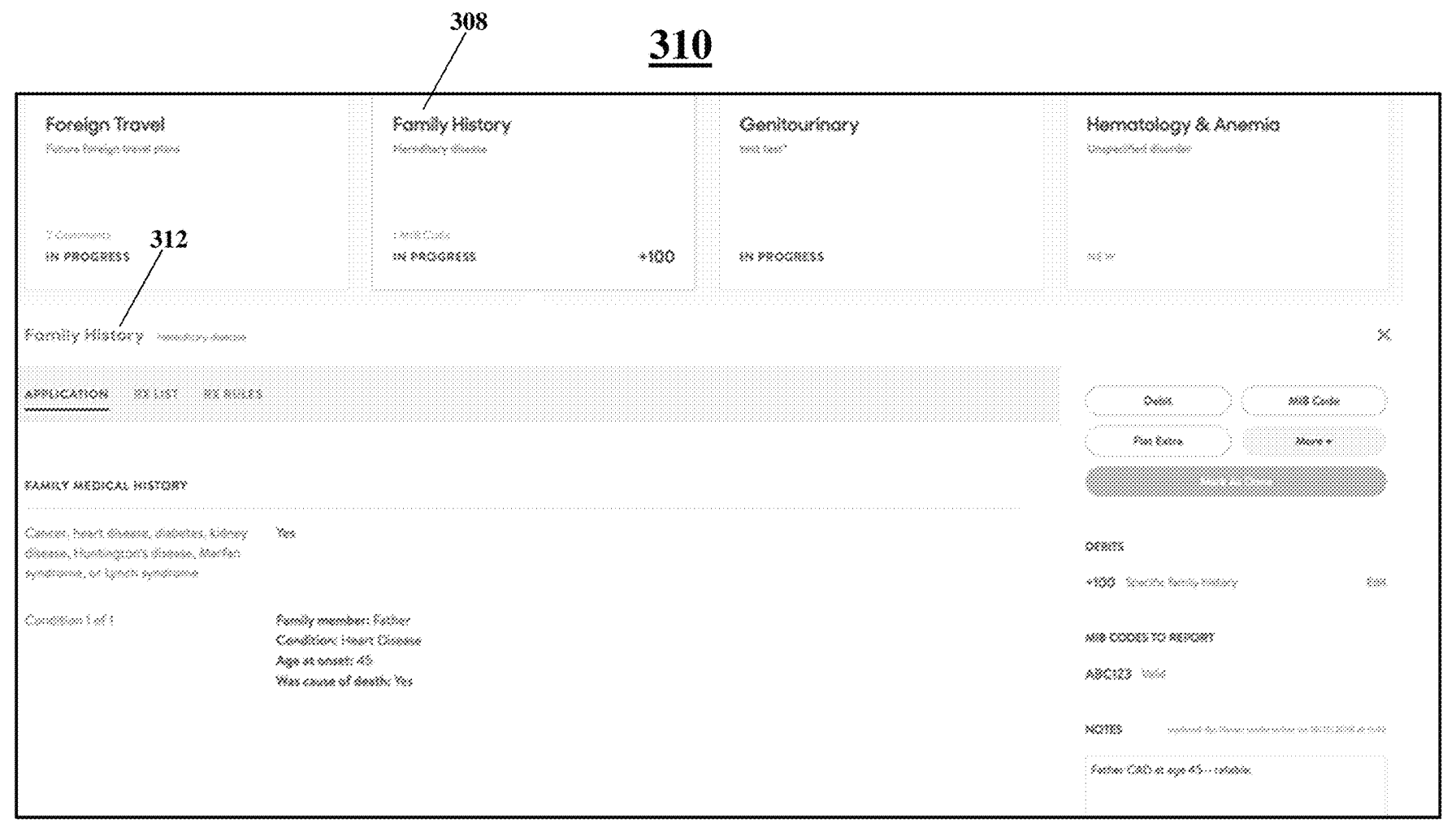

FIGS. 3A-3C show an interactive graphical user interface of an analyst device operated by an analyst. The analyst device may be a portable or a non-portable device, such as, a desktop computer, a laptop computer, a tablet computer, a smart phone, a smart watch, a personal digital assistant, or the like. The analyst device may include a processor, which may perform one or more operations according to one or more programming instructions. The analyst device may be capable of communicating with a system server through a communications network using wired or wireless communication capabilities.

An underwriting software application may be installed on the analyst device or displayed on an analyst-centric website of an insurance company. The underwriting software application may be accessed on the analyst device. The insurance company may generate the underwriting software application as a widget to communicate with different type of analysts, and the widget may be displayed on a website of the insurance company visible to all the analysts. The analyst may be an underwriter of the insurance company. The analyst may use the underwriting software application to receive a request from the customer, process the request, and present an electronic document to the customer in response to the request.

The analyst device may have access to pre-stored web-based interfaces, such as, webpages, comprising a number of preconfigured sub-interfaces, or containers, that are dynamically populated (e.g., widget box). For example, the underwriting software application webpages may contain code, such as, HTML, presenting a website of a number of webpages having a unique look-and-feel. One or more outputs may display the webpages, which may contain the additional code for containers, where the container code displays the underwriting software application widget.

The analyst device may require analyst authentication based upon a set of analyst authorization credentials (e.g., name, password, biometrics, cryptographic certificate) to provide access to the underwriting software application on the analyst device. For example, the analyst device may access a local memory configured to store the analyst credentials, which a webserver may reference in order to determine whether a set of entered credentials purportedly authenticating the analyst match an appropriate set of credentials that identify and authenticate the analyst. Similarly, in some implementations, the webserver may generate and serve the webpages associated with the underwriting software application to the analyst device, based upon the analyst profile account. The webserver may generate and serve the webpages associated with the underwriting software application on the analyst device, based on the analyst membership. The analyst profile may be defined by data fields in the analyst records stored in the local memory, and the webserver may conduct the authentication of the analyst and the analyst profile.

The analyst may access the underwriting software application by a common access method, e.g., keying in a URL, selecting from search results, etc., and submit analyst credentials to access the underwriting software application. Upon the webserver authenticating the analyst using credentials that identify the analyst as a valid member of the insurance company, the analyst is presented a webpage of the underwriting software application on the interactive graphical user interface. The analyst may access the webpage of the underwriting software application to receive the requests from the customer devices, generate queries in response to the requests, transmit the queries to the system server, and receive electronic documents from the system server.

A first page 300 of the underwriting software application may display multiple cases in a queue. The cases may correspond to requests of customers received from customer devices of the customers. The requests of the customers may correspond to preparation of electronic documents (for example, insurance policies) 302. Each case is associated with a selectable graphical component. The analyst may interact with the selectable graphical components to view and review corresponding cases. When the analyst may interact with a selectable graphical component, one or more sub-interfaces may be displayed on the first page 300. The sub-interfaces may display a name, a policy number, a due date, status, product, and state information associated with each electronic document.

When the analyst may interact with a selectable graphical component corresponding to a name of the customer, a second page 304 is generated and displayed on the interactive graphical user interface. The second page 304 may display comprehensive information in a standardized data record associated with the customer. The comprehensive information may include a customer score 307. The customer score 307 may be based on analysis and evaluation of all the information within the standardized data record of the customer. The comprehensive information may further include issues to review 305, such as, foreign travel 306, family history 308, etc. of the customer. Each issue module such as, the foreign travel 306, the family history 308, etc. may include a status indicator and an input element to receive input information. The analyst may review each topic within the issues to review 305 to determine data gaps and submit the input information based on determined data gaps. When the analyst is submitting the input information, the status indicator may indicate "in progress". When all the issues have been resolved, the customer score 307 may be updated and the status indicator may indicate "completed".

When the analyst may interact with a selectable graphical component associated with a record of the family history 308, a third page 310 may be generated and displayed on the interactive graphical user interface. The third page 310 may display comprehensive information 312 associated with the family history 308 of the customer. The analyst may review and validate the comprehensive information 312 associated with the family history 308 of the customer. The comprehensive information 312 may include a list of diseases within the family of the customer.

The various logical blocks, modules, circuits, and algorithm steps described in connection with the embodiments disclosed herein may be implemented as electronic hardware, computer software, or combinations of both. To clearly this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the methods and embodiments described herein. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present subject matter. Various modifications to these embodiments will be readily apparent to those skilled in the art, and the generic principles defined herein may be applied to other embodiments without departing from the spirit or scope of the subject matter. Thus, the present subject matter is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A server-implemented method comprising:
   receiving, by a server, a request for an electronic document from a customer device, wherein the request comprises an identifier associated with a customer operating the customer device;
   retrieving, by the server from a plurality of data-generating systems, a plurality of data records associated with the request using the identifier associated with the customer to generate a standardized data record;
   determining, by the server, one or more data gaps associated with one or more data fields in the standardized data record, the one or more data gaps corresponding to missing data or incomplete data in the standardized data record;
   categorizing, by the server, the one or more data fields into one or more categories based on subject matter within each data field such that each data field is placed in at least one category;
   displaying, by the server, one or more sub-modules associated with each category comprising at least one data field corresponding to at least one data gap on a first graphical user interface of a first analyst device within a plurality of analyst devices, each sub-module comprising a status indicator and an input element to receive an input regarding the missing data or incomplete data, the status indicator corresponding to a completion status of each data gap;
   in response to the first analyst device interacting with the input element of the one or more sub-modules, updating, by the server, the status indicator associated with the one or more sub-modules;
   updating, by the server in real time, the one or more sub-modules displayed on other analyst devices within the plurality of analyst devices such that when a second analyst device views the one or more sub-modules on its second graphical user interface, an updated status indicator corresponding to the interaction of the first analyst device with the input element of the one or more sub-modules is displayed on the second graphical user interface; and
   transmitting, by the server, a notification to the other analyst devices configured to direct the other analyst devices to each updated sub-module.

2. The server-implemented method according to claim 1, further comprising:
   executing, by the server, a comparison protocol to compare each data record within the plurality of data records with remaining data records within the plurality of data records to remove duplicate records within the plurality of data records.

3. The server-implemented method according to claim 2, wherein the comparison protocol is a record linkage software algorithm configured to find same data records in the plurality of data records.

4. The server-implemented method according to claim 2, further comprising:
   executing, by the server, one or more standardization algorithms on the plurality of data records to merge an instance of each of the plurality of data records and generate the standardized data record.

5. The server-implemented method according to claim 1, further comprising:
   generating, by the server, one or more actions items to populate the missing data or provide the incomplete data in the one or more data gaps.

6. The server-implemented method according to claim 5, further comprising:
   programming, by the server, each of the one or more action items for execution within a predetermined period of time.

7. The server-implemented method according to claim 1, wherein the plurality of data-generating systems are configured to generate the plurality of data records according to one or more data models associated with one or more formats.

8. The server-implemented method according to claim 1, wherein the plurality of data-generating systems are configured to generate the plurality of data records according to one or more data models associated with one or more data types.

9. The server-implemented method according to claim 1, wherein the plurality of data-generating systems are configured to generate the plurality of data records corresponding to information associated with the customer.

10. The server-implemented method according to claim 1, further comprising:
    generating, by the server, the standardized data record according to a common data model by transforming one or more formats for the plurality of data records having one or more data types to a single format and a single data type.

11. A system comprising:
    a server configured to:
    receive a request for an electronic document from a customer device, wherein the request comprises an identifier associated with a customer operating the customer device;
    retrieve from a plurality of data-generating systems, a plurality of data records associated with the request using the identifier associated with the customer to generate a standardized data record;
    determine one or more data gaps associated with one or more data fields in the standardized data record, the one or more data gaps corresponding to missing data or incomplete data in the standardized data record;
    categorize the one or more data fields into one or more categories based on subject matter within each data field such that each data field is placed in at least one category;
    display one or more sub-modules associated with each category comprising at least one data field corresponding to at least one data gap on a first graphical user interface of a first analyst device within a plurality of analyst devices, each sub-module comprising a status indicator and an input element to receive an input regarding the missing data or incomplete data, the status indicator corresponding to a completion status of each data gap;
    in response to the first analyst device interacting with the input element of the one or more sub-modules, update the status indicator associated with the one or more sub-modules;
    update in real time, the one or more sub-modules displayed on other analyst devices within the plurality of analyst devices such that when a second analyst device views the one or more sub-modules on its second graphical user interface, an updated status indicator corresponding to the interaction of the first analyst device with the input element of the one or more sub-modules is displayed on the second graphical user interface; and transmit a notification to the other analyst devices configured to direct the other analyst devices to each updated sub-module.

12. The system according to claim 11, wherein the server is further configured to:

execute a comparison protocol to compare each data record within the plurality of data records with remaining data records within the plurality of data records to remove duplicate records within the plurality of data records.

13. The system according to claim 12, wherein the comparison protocol is a record linkage software algorithm configured to find same data records in the plurality of data records.

14. The system according to claim 12, wherein the server is further configured to:

execute one or more standardization algorithms on the plurality of data records to merge an instance of each of the plurality of data records and generate the standardized data record.

15. The system according to claim 11, wherein the server is further configured to:

generate one or more actions items to populate the missing data or provide the incomplete data in the one or more data gaps.

16. The system according to claim 15, wherein the server is further configured to:

program each of the one or more action items for execution within a predetermined period of time.

17. The system according to claim 11, wherein the plurality of data-generating systems are configured to generate the plurality of data records according to one or more data models associated with one or more formats.

18. The system according to claim 11, wherein the plurality of data-generating systems are configured to generate the plurality of data records according to one or more data models associated with one or more data types.

19. The system according to claim 11, wherein the plurality of data-generating systems are configured to generate the plurality of data records corresponding to information associated with the customer.

20. The system according to claim 11, wherein the server is further configured to:

generate the standardized data record according to a common data model by transforming one or more formats for the plurality of data records having one or more data types to a single format and a single data type.

* * * * *